US012811663B2

(12) United States Patent
Hakola et al.

(10) Patent No.: US 12,811,663 B2
(45) Date of Patent: Nov. 24, 2026

(54) QUASI-COLOCATION ASSUMPTIONS IN FAST DOWNLINK BEAM SWITCHING

(71) Applicant: Nokia Technologies Oy, Espoo (FI)

(72) Inventors: Sami-Jukka Hakola, Oulu (FI); Juha Pekka Karjalainen, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 272 days.

(21) Appl. No.: 18/698,768

(22) PCT Filed: Sep. 22, 2022

(86) PCT No.: PCT/EP2022/076307

§ 371 (c)(1),
(2) Date: Apr. 4, 2024

(87) PCT Pub. No.: WO2023/061715

PCT Pub. Date: Apr. 20, 2023

(65) Prior Publication Data

US 2024/0405819 A1 Dec. 5, 2024

Related U.S. Application Data

(60) Provisional application No. 63/254,423, filed on Oct. 11, 2021.

(51) Int. Cl.
*H04B 7/06* (2006.01)

(52) U.S. Cl.
CPC ....... *H04B 7/06968* (2023.05); *H04B 7/0617* (2013.01)

(58) Field of Classification Search
CPC ... H04L 5/0023; H04L 5/0053; H04L 5/0094; H04B 7/0617; H04B 7/0695; H04B 7/06968; H04B 7/088
See application file for complete search history.

(56) References Cited

U.S. PATENT DOCUMENTS

2019/0379431 A1* 12/2019 Park ..................... H04B 7/0408
2020/0267571 A1* 8/2020 Park ................... H04B 7/06968
(Continued)

FOREIGN PATENT DOCUMENTS

WO 2020/204322 A1 10/2020

OTHER PUBLICATIONS

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

(Continued)

*Primary Examiner* — Benjamin H Elliott, IV
(74) *Attorney, Agent, or Firm* — Barta Jones, PLLC

(57) ABSTRACT

Systems, methods, apparatuses, and computer program products for fast downlink beam switching assumptions related to quasi-colocation are provided. For example, a method can include determining whether a reported downlink reference signal corresponds to a reference signal, based on a spatial reception parameter corresponding to channel conditions and supporting beamforming, with a resource set that is configured to a user equipment with a tracking reference signal parameter. The method can also include interpreting a downlink reception parameter based on the determination regarding the reported downlink reference signal. The method can further include controlling at least a receive beam or a transmit beam of the user equipment based on the interpretation of the downlink transmission configuration indicator state.

11 Claims, 5 Drawing Sheets

(56) References Cited

U.S. PATENT DOCUMENTS

| | | | | |
|---|---|---|---|---|
| 2020/0304186 | A1* | 9/2020 | Venugopal | H04B 7/088 |
| 2021/0344397 | A1* | 11/2021 | Lee | H04L 5/0048 |
| 2021/0392514 | A1* | 12/2021 | Matsumura | H04B 7/088 |
| 2022/0190977 | A1* | 6/2022 | Lee | H04B 7/06968 |
| 2023/0291442 | A1* | 9/2023 | Davoli | H04B 7/0408 |
| 2024/0388406 | A1* | 11/2024 | Matsumura | H04L 5/0051 |
| 2024/0405819 | A1* | 12/2024 | Hakola | H04L 5/0053 |
| 2024/0407037 | A1* | 12/2024 | Matsumura | H04B 7/06968 |
| 2025/0141529 | A1* | 5/2025 | Matsumura | H04B 7/088 |

OTHER PUBLICATIONS

"Enhancements on Multi-beam Operation", 3GPP TSG RAN WG1 #106-bis-e, R1-2109870, Agenda: 8.1.1, Nokia, Oct. 11-19, 2021, 29 pages.

International Search Report and Written Opinion received for corresponding Patent Cooperation Treaty Application No. PCT/EP2022/076307, dated Nov. 29, 2022, 13 pages.

"Enhancements on Multi-beam Operation", 3GPP TSG RAN WG1 Meeting #106-bis-e, R1-2110165, Agenda: 8.1.1, Qualcomm Incorporated, Oct. 11-19, 2021, 16 pages.

"On Beam Management Enhancementn", 3GPP TSG-RAN WG1 Meeting #106b-e, R1-2110013, Agenda: 8.1.1, Apple Inc., Oct. 11-19, 2021, 21 pages.

"3rd Generation Partnership Project; Technical Specification Group Radio Access Network; NR; Physical layer procedures for data (Release 16)", 3GPP TS 38.214, V16.7.0, Sep. 2021, pp. 1-172.

* cited by examiner

QUASI-COLOCATION ASSUMPTIONS IN FAST DOWNLINK BEAM SWITCHING

RELATED APPLICATION

This application was originally filed as PCT Application No. PCT/EP2022/076307, filed on Sep. 22, 2022, which claims priority from U.S. Provisional Application No. 63/254,423, filed on Oct. 11, 2021, of which priority is claimed and is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing fast downlink beam switching assumptions related to quasi-colocation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform determining whether a reported downlink reference signal corresponds to a reference signal, based on a spatial reception parameter corresponding to channel conditions and supporting beamforming, with a resource set that is configured to a user equipment with a tracking reference signal parameter. The at least one memory and computer program code can also be configured, with the at least one processor, to cause the apparatus at least to perform interpreting a downlink reception parameter based on the determination regarding the reported downlink reference signal. The at least one memory and computer program code can further be configured, with the at least one processor, to cause the apparatus at least to perform controlling at least a receive beam or a transmit beam of the user equipment based on the interpretation of the downlink transmission configuration indicator state.

An embodiment may be directed to an apparatus. The apparatus can include at least one processor and at least one memory comprising computer program code. The at least one memory and computer program code can be configured, with the at least one processor, to cause the apparatus at least to perform determining whether a reported downlink reference signal corresponds to a quasi-colocation type D reference signal with a resource set that is configured to a user equipment with a tracking reference signal parameter. The at least one memory and computer program code can also be configured, with the at least one processor, to cause the apparatus at least to perform interpreting a downlink reception parameter based on the determination regarding the reported downlink reference signal. The at least one memory and computer program code can further be configured, with the at least one processor, to cause the apparatus at least to perform transmitting to or receiving from the user equipment based on the interpretation of the downlink transmission configuration indicator state.

An embodiment may be directed to a method. The method can include determining whether a reported downlink reference signal corresponds to a reference signal, based on a spatial reception parameter corresponding to channel conditions and supporting beamforming, with a resource set that is configured to a user equipment with a tracking reference signal parameter. The method can also include interpreting a downlink reception parameter based on the determination regarding the reported downlink reference signal. The method can further include controlling at least a receive beam or a transmit beam of the user equipment based on the interpretation of the downlink transmission configuration indicator state.

An embodiment may be directed to a method. The method can include determining whether a reported downlink reference signal corresponds to a reference signal, based on a spatial reception parameter corresponding to channel conditions and supporting beamforming, with a resource set that is configured to a user equipment with a tracking reference signal parameter. The method can also include interpreting a downlink reception parameter based on the determination regarding the reported downlink reference signal. The method can further include transmitting to or receiving from the user equipment based on the interpretation of the downlink transmission configuration indicator state.

An embodiment may be directed to an apparatus. The apparatus may include means for determining whether a reported downlink reference signal corresponds to a reference signal, based on a spatial reception parameter corresponding to channel conditions and supporting beamforming, with a resource set that is configured to a user equipment with a tracking reference signal parameter. The apparatus can also include means for interpreting a downlink reception parameter based on the determination regarding the reported downlink reference signal. The apparatus can further include means for controlling at least a receive beam or a transmit beam of the user equipment based on the interpretation of the downlink transmission configuration indicator state.

An embodiment may be directed to an apparatus. The apparatus may include means for determining whether a reported downlink reference signal corresponds to a reference signal, based on a spatial reception parameter corresponding to channel conditions and supporting beamforming, with a resource set that is configured to a user equipment with a tracking reference signal parameter. The apparatus can also include means for interpreting a downlink reception parameter based on the determination regarding the reported downlink reference signal. The apparatus can further include means for transmitting to or receiving from the user equipment based on the interpretation of the downlink transmission configuration indicator state.

BRIEF DESCRIPTION OF THE DRAWINGS

For proper understanding of example embodiments, reference should be made to the accompanying drawings, wherein.

DETAILED DESCRIPTION

Figure 1:
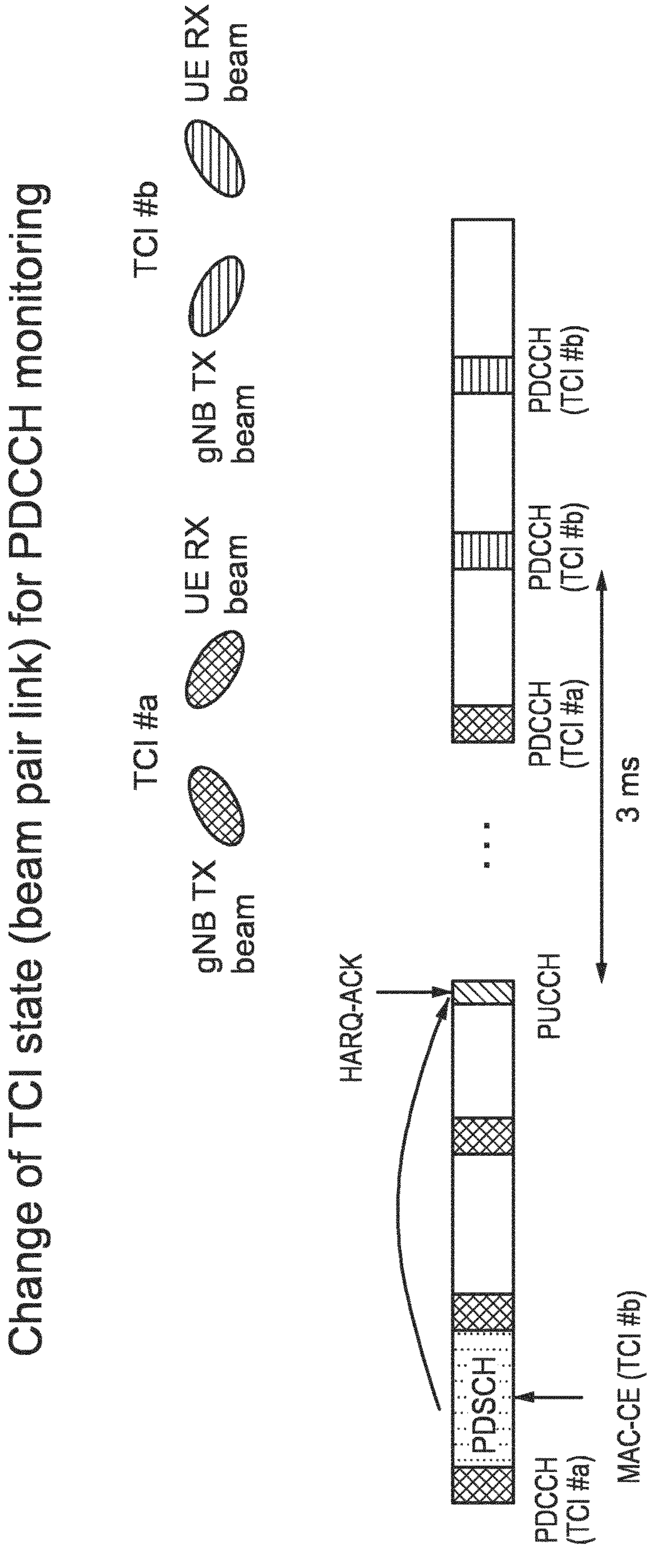
FIG. 1 illustrates transmission coordination indicator state switching.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing fast downlink beam switching assumptions related to quasi-colocation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to New Radio (NR) physical layer development. More specifically, certain embodiments provide a way to reduce latency and overhead in beam pair link (BPL) switching. Beam pair link can refer in downlink to aligned next generation Node B (gNB) transmission (TX) beam and UE reception (RX) beam pair and in uplink to aligned UE TX beam and gNB RX beam.

There may be various ways to trigger DL and/or UL beam pair link switching directly from the UE provided beam report or from a specific signal transmitted by the UE. UE-initiated beam selection/activation can be based on beam measurement and/or reporting, without beam indication or activation from the network (NW).

For example, UE-initiated (DL-only or DL/UL) beam selection can include the following options. In one option, the selected beam can be reported by an event-triggered UE beam reporting via, for example, UCI, MAC CE, UL CG, or Type 1/Type 2 CBRA/CFRA. In another option, the selected beam can be reported by a legacy UE beam report. Thus, in this option, the selected beam can be NW-configured.

The triggering condition and NW-indication of a beam group in which the UE is allowed to do the beam selection can be variously configured. For example, the NW-indication can be provided via MAC-CE. There can also be NW confirmation. For example, if no NW beam selection command overwriting the selected beam is received in a time window after the report, this can be taken as confirmation of the selected beam.

UE-initiated beam activation can be based on beam reporting. The reported beam(s) can be activated as active TCI/spatial relation RS(s) automatically without NW activation command after receiving gNB response signaling, such as DCI/MAC CE. The reported beam can be applied directly if the number of supported activated beam by the UE is one and/or after receiving gNB response signaling, or if no NW activation command overwrites the beam(s) activated by the report in a time window after the report.

UE-initiated UL-only beam selection can consider potential misalignment between network and UE on the selected beams. For example, the UE can select an alternative beam from the other beams in the gNB-configured set containing more than one UL beam.

Certain embodiments relate to UE-initiated beam activation based on beam reporting. Certain embodiments may simplify and potentially also accelerate beam switching. For example, certain embodiments may directly provide a gNB response to the beam report. In some examples, the gNB can confirm whether the current QCL/spatial source of the current indicated TCI state (for example, the TCI state of the unified TCI framework) is switched to the reported DL RS or to a certain one of the reported DL RSs if more than one is reported at a time. In some instances, gNB response/confirmation can be valuable so that the gNB and the UE remain synchronized in a beam domain.

Beam management can include a set of procedures and functionalities that enable, maintain and refine the transmit and receive beam alignment between the transmitter and the receiver(s). A beam pair link established between the transmitter and the receiver can include a transmit beam and receive beam pair. The beam pair link between gNB and UE may be the same or different in downlink and uplink. Thus, in DL the transmit beam of the gNB may be in a beam pair with the receive beam of the UE. Similarly, in UL the transmit beam of the UE may be in a beam pair with the transmit beam of the gNB. In DL, the gNB can provide the UE with a quasi-co-location (QCL)-Type D RS. Based on the QCL-Type D RS, the UE can set the UE's own receive beam. When the UE has measured QCL Type D RS with a certain receive beam, then when the UE is to receive downlink transmission based on the given QCL Type D RS, the UE can assume that the UE itself can use the same receive beam to receive downlink transmission as the UE used to receive earlier QCL Type D RS. The gNB can also provide spatial relation information related to UL, based on which the UE can further set the UE's own transmit beam. For example, QCL-TypeD RS can be used to determine the UE's transmit beam for UL transmission as well.

The quasi-co-location of two antenna ports can imply that the channel conditions for the symbols transmitted from those antenna ports may be similar. Depending on the set of properties for the channel conditions, 3GPP TS 38.214 defines the following QCL-types: QCL-Type A, QCL-Type B, QCL-Type C, and QCL-Type D. Certain embodiments relate to the QCL-Type D, where the spatial Rx parameter can be employed to define the channel conditions and can be used to support beamforming.

QCL defines the relation between two reference signals at the UE receiver. In practice, the gNB can guarantee that the properties of two reference signals are similar if the two reference signals are transmitted from the same transmission and reception point (TRP). New radio (NR) may permit transmission of any reference signal from any TRP. Thus, QCL can be applied more broadly.

QCL-Type D RS can be SSB or CSI-RS. In a beam indication for the target signal to be received (for example, DMRS of PDSCH, DMRS of PDCCH, CSI-RS) the UE can be provided a TCI state, which can serve as a container and can include an indication of the QCL-Type D RS.

The UE can apply the same RX beam to receive the target signal, as the UE used to receive the given QCL-Type D RS, which may be SSB or CSI-RS resource, in the TCI state. The UE can be configured with up to 64 or 128 (if UE capability allows) TCI states. TCI state container is described in 3GPP TS 38.331, and can include a QCL-Info information element, which can contain qcl-type data, which can be enumerated as typeA, typeB, typeC, or typeD.

For the UL, the UE can be provided with a spatial source RS. Also, the UE can determine UL TX beam from the QCL-Type D RS if, for example, TCI state is given for the UL transmission as the reference. The spatial resource can be an SSB, CSI-RS or SRS. In case of SSB or CSI-RS, the UE can use the RX beam used to receive the given SSB or CSI-RS resource as a spatial relation for the TX beam to transmit target signal (for example, PUSCH, PUCCH, and/or SRS). In case of SRS, the UE can use, as TX beam to transmit target signal, the same TX beam that is used to transmit the given SRS resource. The spatial relation info, for example, for SRS is defined by 3GPP TS 38.331. For example, the SRS-SpatialRelationshipInfo can include a serving cell identifier, an SSB index, and a CSI RS index, as well as a resource identifier and uplink BWP for SRS.

Candidate reference signals can be measured and reported. These candidate reference signals can act as a source to determine transmit and receive beam pair in downlink and in uplink.

The DL RSs can be used for both DL and UL beam indication. TX/RX beam correspondence can be assumed at the UE. The UE can be explicitly configured with SSB and/or CSI-RS resources for L1-RSRP measurements and reporting, for example using a CSI-RS framework. The UE may be configured with CSI-RS resource setting for up to 16 CSI-RS resource sets having up to 64 resources within each set. The total number of different CSI-RS resources over all resource sets may be limited to being no more than 128. The UE can report the L1-RSRP of {1, 2, 3, or 4} best SSBs or CSI-RSs per report configuration. The reporting can include a resource index and an L1-RSRP value.

Beam indication and beam switching can have various considerations. In downlink, the UE can be provided a TCI state for the target signal, based on which the UE can receive the target signal. The TCI state can be provided in a variety of ways. For example, the TCI state can be provided with RRC configuration for P-CSI-RS, which may include TRS. As another example, the TCI state can be provided with MAC-CE for PDCCH (one active TCI state per CORESET), SP-CSI-RS, AP-CSI-RS, or PDSCH when PDSCH follows PDCCH. As a further example, the TCI state can be provided with DCI for PDSCH (when explicit indication is in use) and AP-CSI-RS, which may involve triggering of certain CSI-RS resource set(s).

In uplink, the UE can be provided a spatial relation for the target signal. Based on the spatial relation the UE can form the transmit beam. The provisioning of the spatial relation may be done in various ways. For example, the provisioning of the spatial relationship can be RRC based for P-SRS. As another example, the provisioning of the spatial relationship can be MAC-CE based, for example, for SP-SRS, AP-SRS, PUCCH, or PUSCH when PUSCH follows PUCCH with resource ID=0. As a further example, the provisioning of the spatial relationship can be DCI based indirectly for PUSCH. For example, DCI can indicate reference SRS(s) so that UE can transmit PUSCH with the same beam(s) as the UE transmitted given SRSs.

The UE and gNB may operate on a number of assumptions, which may be shared assumptions. As to PDSCH, if scheduling offset is less than timeDurationForQCL, then the TCI state can be the one of the lowest CORESET ID in the latest slot monitored by UE. On the other hand, if scheduling offset is greater than or equal to timeDurationForQCL, the TCI state can be the one of the CORESET of the scheduling PDCCH, if TCI state is not provided in the DCI. PDSCH reception can be based on the TCI state provided in DCI.

As to AP-CSI-RS, if the scheduling offset is less than beamSwitchTiming, then the UE can either align the TCI state with an overlapping other signal TCI state, or can apply TCI state of the lowest CORESET ID in the latest slot monitored by UE.

As to PUCCH/SRS, if the spatial relation is not configured, then in frequency range 2 (FR2) the UE can determine the spatial relation as follows. When CORESET(s) are configured on the component carrier (CC), the TCI state/QCL assumption can follow the one of the CORESET with the lowest ID. When any CORESETs are not configured on the CC, the activated TCI state with the lowest ID can be applicable to PDSCH in the active DL-BWP of the CC.

As to PUSCH scheduled by DCI format 0_0, when there are no PUCCH resources configured on the active UL BWP CC in FR2 and in RRC-connected mode, the default spatial relation can be the TCI state/QCL assumption of the CORESET with the lowest ID.

In a multi-TRP scenario, TCI codepoint can include two TCI states. For a default beam case, the UE can assume the TCI states of the TCI codepoint with the lowest ID, for example for PDSCH.

MAC-CE based beam switching, for example activation of TCI state in downlink and activation of spatial relation RS in uplink, can follow the following principles. The UE can apply the new assumption e.g., approximately 3 ms after the UE has sent the HARQ-ACK for the PDSCH carrying the MAC-CE.

FIG. 1 illustrates transmission coordination indicator state switching. More particularly, FIG. 1 provides a high level illustration for the TCI state switching for the CORESET, for example for PDCCH reception. FIG. 1 illustrates the UE applying a new state 3 ms after the UE has sent the HARQ-ACK for the PDSCH carrying the MAC-CE. The new state can be determined from the MAC-CE contained in the PDSCH. The gNB can understand that the UE will apply the new state based on receiving the HARQ-ACK in PUCCH. Accordingly, the switch to the new TCI state can be coordinated between the UE and the gNB.

The scheme described above may work as such for the UL beam pair link. The reported RS can be used as a QCL-Type D source RS.

Based on the RS, the UE can form the UL TX beam. For the DL beam pair link, the UE may need to be provided with, determine, or derive QCL-Type A RS in the new beam pair link for the DL reception. PDCCH and PDSCH reception may need QCL-Type A RS to be provided for the UE, as described at 3GPP TS 38.214, section 5.1.5.

For the DM-RS of PDCCH, the UE may expect that a TCI-State indicates one of the following quasi co-location type(s). The UE may expect 'typeA' with a CSI-RS resource in a NZP-CSI-RS-ResourceSet configured with higher layer parameter trs-Info and, when applicable, 'typeD' with the same CSI-RS resource. The UE may expect 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition. The UE may expect 'typeA' with a CSI-RS resource in a NZP-CSI-RS-ResourceSet configured without higher layer parameter trs-Info and without higher layer parameter repetition and, when applicable, 'typeD' with the same CSI-RS resource.

For the DM-RS of PDSCH, the UE may expect that a TCI-State indicates one of the following quasi co-location type(s). The UE may expect 'typeA' with a CSI-RS resource in a NZP-CSI-RS-ResourceSet configured with higher layer parameter trs-Info and, when applicable, 'typeD' with the same CSI-RS resource. The UE may expect 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition. The UE may expect 'typeA' with a CSI-RS resource in a NZP-CSI-RS-ResourceSet configured without higher layer parameter trs-info and without higher layer parameter repetition and, when applicable, 'typeD' with the same CSI-RS resource.

For a CSI-RS resource in an NZP-CSI-RS-ResourceSet configured without higher layer parameter trs-Info and without the higher layer parameter repetition, the UE may expect that a TCI-State indicates one of the following quasi co-location type(s). The UE may expect 'typeA' with a CSI-RS resource in a NZP-CSI-RS-ResourceSet configured with higher layer parameter trs-Info and, when applicable, 'typeD' with the same CSI-RS resource. The UE may expect 'typeA' with a CSI-RS resource in a NZP-CSI-RS-ResourceSet configured with higher layer parameter trs-Info and, when applicable, 'typeD' with an SS/PBCH block. The UE may expect 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition. The UE may expect 'typeB' with a CSI-RS resource in a NZP-CSI-RS-ResourceSet configured with higher layer parameter trs-Info when 'typeD' is not applicable, for example in FR1 deployment.

Thus, the UE may have CSI-RS configured with higher layer parameter trs-Info. For example, the UE may be configured with the TRS available for the UE so that the UE may be able to receive PDCCH and PDSCH, as well as CSI-RS from the new beam pair link in DL.

In certain embodiments, under the consideration of UE-initiated beam activation based on beam reporting, QCL-TypeD RS of the current indicated TCI state may be switched to the reported DL RS in the beam report if the gNB sends ACK as a response. Moreover, certain embodiments may determine QCL-TypeA RS for DL TCI state.

Figure 2:
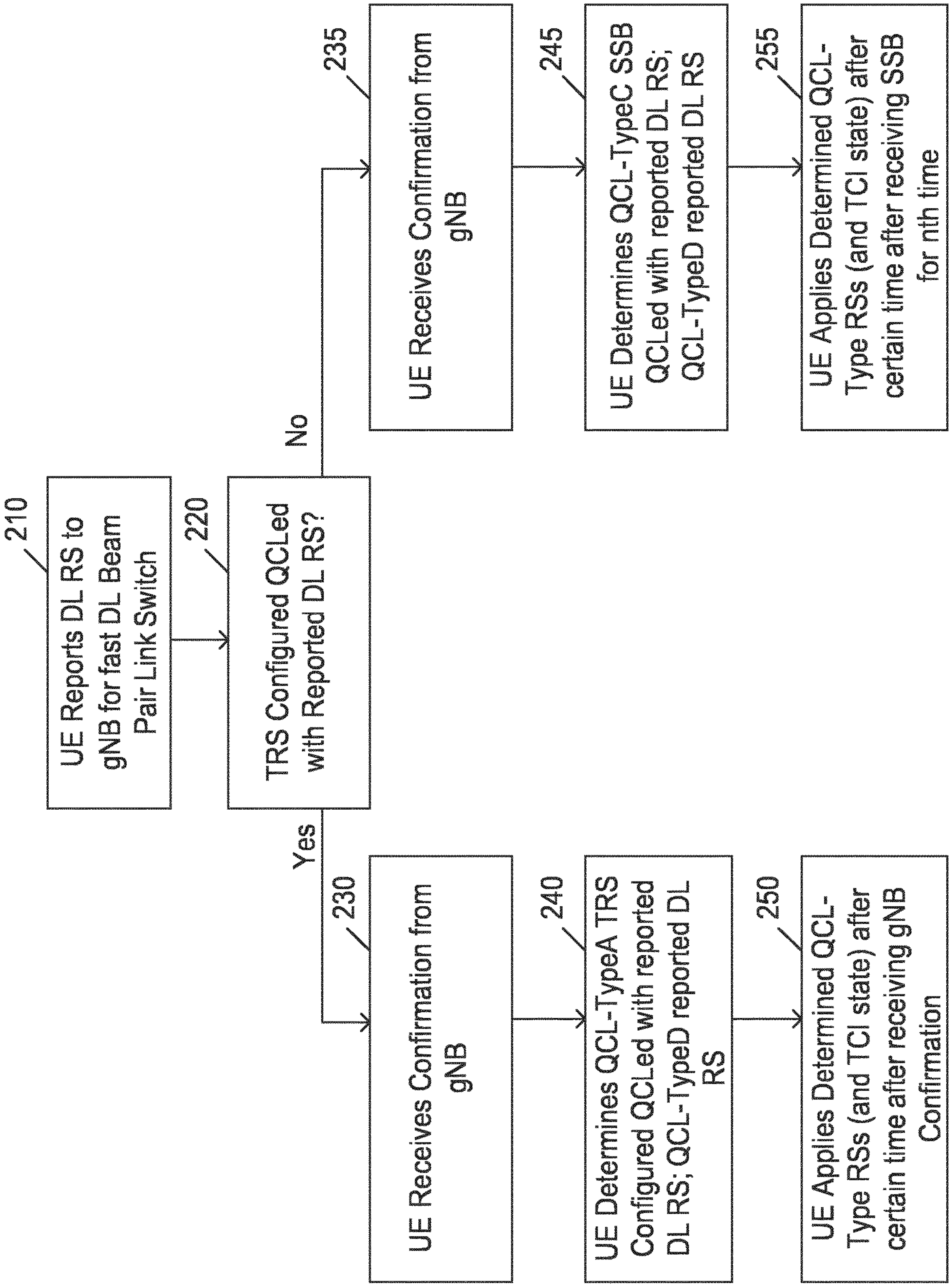
FIG. 2 illustrates an example of a method according to certain embodiments.

There can be several different possible approaches, each of which may have various rules and UE behaviors. FIG. 2 illustrates an example of a method according to certain embodiments. As shown in FIG. 2, at 210, the UE can report DL RS to gNB for fast DL beam pair. At 220, a determination can be made by the UE as to whether the UE's reported DL RS is quasi-colocated (QCLed) in terms of QCL-TypeD with any of the configured CSI-RS resource of which resource set is configured with higher layer parameter trs-Info.

If one RS, for example a source signal that determines characteristics for the reception of target signal in DL or for the transmission of target signal in UL, is quasi-co-colocated with another RS, for example a target signal, this can imply that the UE can assume when receiving the target signal that the target signal has similar characteristics as the source signal. The specific characteristics can be determined by the type of the quasi-colocation (for example, Type A, Type B, Type C, and Type D) Type D, for example, may indicate a spatial reception parameter. In such a case, when the UE is receiving the target signal, the UE can assume the same or similar receive beam as for the source signal if the target signal QCLed in QCL Type D sense with the source signal.

If so, at 240 the UE can assume that the new indicated TCI state for the downlink beam pair link is having the CSI-RS resources of the resource set as QCL-TypeA RS and the reported DL as QCL-TypeD RS. The assumption at 240 can be conditional on the gNB's confirmation received by the UE at 230. For example, the gNB can confirm that the UE's reported DL RS can be QCL-TypeD RS for the TCI state representing the new DL beam pair link. In one alternative, the gNB's response may provide the UE with the index to a CSI-RS resource set configured with higher layer parameter trs-Info that would be applied, at 250, by the UE as the QCL-TypeA RS for the TCI state representing the new DL beam pair link. In this case, reported DL RS can act as a QCL-TypeD RS. In this case, the beam switching latency can be made dependent on either the time instant the UE provided the report of DL RS to gNB or the time instant the UE receives the gNB response.

On the other hand, if the UE does not have a configured CSI-RS resource of which resource set is configured with higher layer parameter trs-Info that is QCLed in terms of QCL-TypeD with the reported DL RS, then at 245 the UE may assume the SSB QCLed with the reported DL RS as the QCL-TypeC (to provide timing synchronization) for the TCI state representing the new DL beam pair link until the gNB provides QCL-TypeA RS for the TCI state. The assumption at 245 may be conditional on the gNB's confirmation at 235. For example, the gNB can confirm that the UE's reported DL RS can be QCL-TypeD RS for the TCI state representing the new DL beam pair link. In this case, the beam switching latency can be made dependent on the transmission time instant of the SSB mentioned above. Before the new beam pair link is applied for the PDCCH and PDSCH reception the UE can have the possibility to receive the given SSB n times where n can be ≥1. Application time of the switch can be a predetermined time after transmission time instant of the SSB in question for the nth time. The predetermined time may be 3 ms as in the example above, or another.

In another alternative, the UE may report only DL RS(s) that is/are QCLed in terms of QCL-TypeD with any of the configured CSI-RS resource set configured with higher layer parameter trs-Info. If the UE does not measure any such DL RS with the RSRP value greater than preconfigured/predefined RSRP threshold the UE may report any other DL RS(s). In that case the beam switch based on the UE report is not applied. If the UE can provide such DL RS(s), the UE's subsequent processing may be conditional on the gNB's confirmation. The gNB may confirm that the UE's reported DL RS or certain reported DL RS can be QCL-TypeD RS for the TCI state representing the new DL beam pair link. In this example, the beam switching latency can be made dependent on either the time instant the UE provided the report of DL RS to gNB or the time instant the UE receives the gNB response.

In another alternative, the beam pair link switch can happen directly based on the report if the UE reports DL RS(s) that is/are QCLed in terms of QCL-TypeD with any of the configured CSI-RS resource set configured with higher layer parameter trs-Info. Otherwise, the existing beam switch functionality can be applied. If the UE can provide such DL RS(s) the functionality switch may be conditional on the gNB's confirmation. For example, the gNB can confirm that the UE's reported DL RS or certain reported DL RS can be QCL-TypeD RS for the TCI state representing the new DL beam pair link. In this example, the beam switching latency can be made dependent on either the time instant the UE provided the report of DL RS to gNB or the time instant the UE receives the gNB response.

It is noted that FIG. 2 is provided as one example embodiment of a method or process. However, certain embodiments are not limited to this example, and further examples are possible as discussed elsewhere herein.

Figure 3:
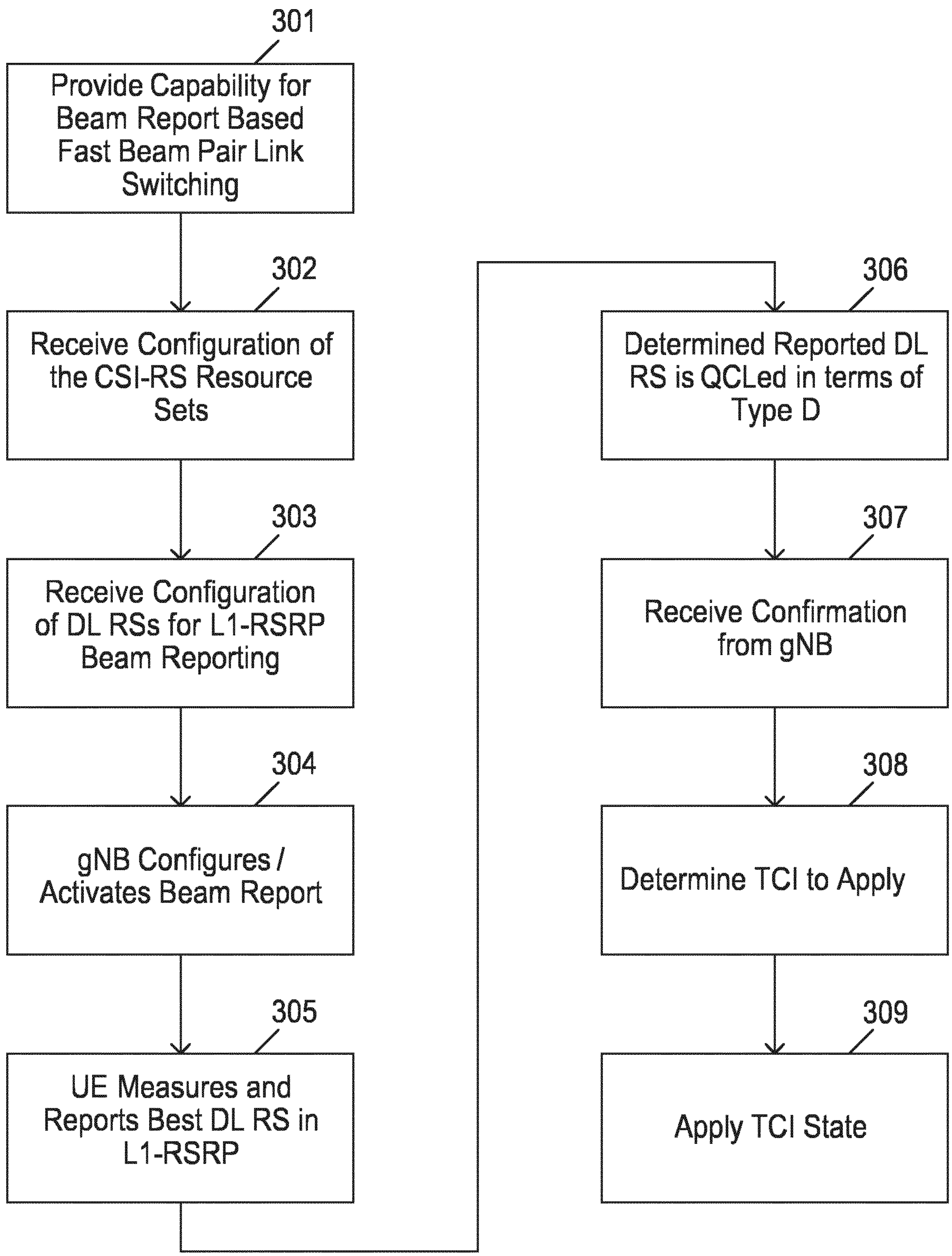
FIG. 3 illustrates another example of a method according to certain embodiments.

FIG. 3 illustrates another method according to certain embodiments. FIG. 3 may be viewed as a more specific implementation of the approach illustrated in FIG. 2.

As shown in FIG. 3, at 301, the UE may provide capability for the beam-report-based fast beam pair link switching. This capability can also be referred to as fast TCI state switching or fast TCI state update. At 302, the UE can receive configuration of the CSI-RS resource sets with higher layer parameter trs-Info with certain QCL-TypeD RSs.

At 303, the UE can receive configuration of DL RSs for the L1-RSRP beam reporting. The gNB can, at 304, configure and/or activate beam report based fast TCI state switch/update for the UE. The UE can, at 305, measure and report best DL RS in L1-RSRP.

At 306, the UE can determine that the reported DL RS is QCLed in terms of QCL-TypeD with one of the configured CSI-RS resource of which resource set is configured with higher layer parameter trs-Info. Moreover, at 307, the UE can receive confirmation from the gNB. For example, the UE may detect a confirmation indication on PDCCH, using a new or modified DCI format.

At 308, the UE can determine the TCI state to be applied after certain time to have determined CSI-RS resource of the CSI-RS resource set in step 6 to be QCL-TypeA RS in the TCI state and the reported and confirmed DL RS as QCL-TypeD RS in the TCI state. At 309, the UE can apply the TCI state determined at 308 a predefined time after receiving the confirmation PDCCH from the gNB. For example, as in the previous examples, the predefined may be 3 ms or another value.

It is noted that FIG. 3 is provided as one example embodiment of a method or process. However, certain embodiments are not limited to this example, and further examples are possible as discussed elsewhere herein.

Figure 4:
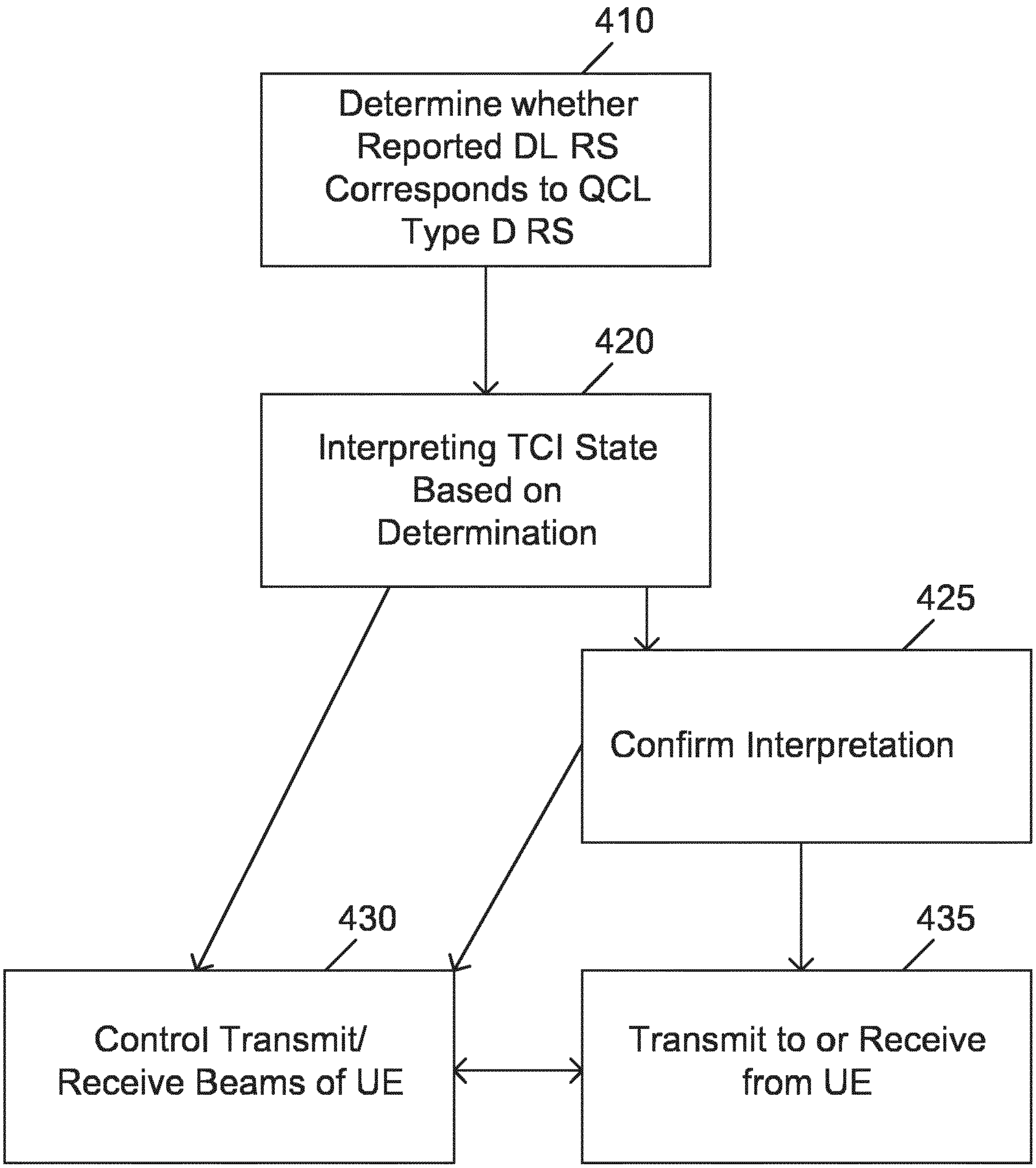
FIG. 4 illustrates yet another method according to certain embodiments.

FIG. 4 illustrates yet another method according to certain embodiments. As shown in FIG. 4, a method can include, at 410, determining whether a reported downlink reference signal corresponds to a reference signal, based on a spatial reception parameter corresponding to channel conditions and supporting beamforming, with a resource set that is configured to a user equipment with a tracking reference signal parameter. The reference signal can be a quasi-colocation type D reference signal. The determining can also or alternatively include determining that the reported downlink reference signal has same or similar characteristics from a spatial reception point of view. Regarding, corresponding, the reported DL RS can be considered corresponding when the reported DL RS has the same or similar characteristics in terms of the spatial reception parameter as the resource set with trsInfo. For example, if the transmission is transmitted to the same or similar direction at the gNB, then at the UE side the UE could use the same or similar receive beam. This aspect of the method may be performed independently at a UE and at a network element, such as serving network element, for example a gNB.

At 420, the method may also include interpreting a downlink transmission configuration indicator state, for example a downlink transmission configuration indicator state, based on the determination regarding the reported downlink reference signal. This aspect of the method may likewise be independently performed by both a UE and a network element. One or more reception parameters and/or one or more quasi-colocation resources can be associated with the transmission configuration indicator state. For the reception of the downlink transmission the UE can use the reported DL RS to determine spatial reception parameters, for example the characteristics of the receive beam. This determination can also be broadly included within the interpreting.

At 430, the method can further include the UE controlling at least a receive beam or a transmit beam of the user equipment based on the interpretation of the downlink transmission configuration indicator state.

The interpretation can involve interpreting that a reference signal based on Doppler shift, Doppler spread, average delay, and delay spread, for example a quasi-colocation type A reference signal, is to be configured (see, for example, the "yes" branch of FIG. 2). Alternatively, the interpretation can involve interpreting that a reference signal based on average delay and Doppler shift, for example a quasi-colocation type C reference signal is to be configured (see, for example, the "no" branch of FIG. 2).

The controlling at 430 can be contingent on the interpreting being confirmed at 425 by a subsequent communication from a serving network element. Thus, at 425, the method can include confirming (by the network element) the interpretation with a communication to the user equipment after the downlink reference signal.

The controlling at 430 can include applying a determined quasi-colocation type reference signal and transmission configuration indicator state after a predetermined time period. The predetermined time period can begin upon receiving confirmation of the interpretation from a serving network element.

The method can also include, at 435, transmitting to or receiving from the user equipment based on the interpretation of the downlink transmission configuration indicator state.

The transmitting to or receiving from the user equipment at 435 can include switching to the interpretation after a predetermined time period. The predetermined time period can begin upon sending confirmation of the interpretation to the user equipment.

It is noted that FIG. 4 is provided as one example embodiment of a method or process. However, certain embodiments are not limited to this example, and further examples are possible as discussed elsewhere herein.

Figure 5A:
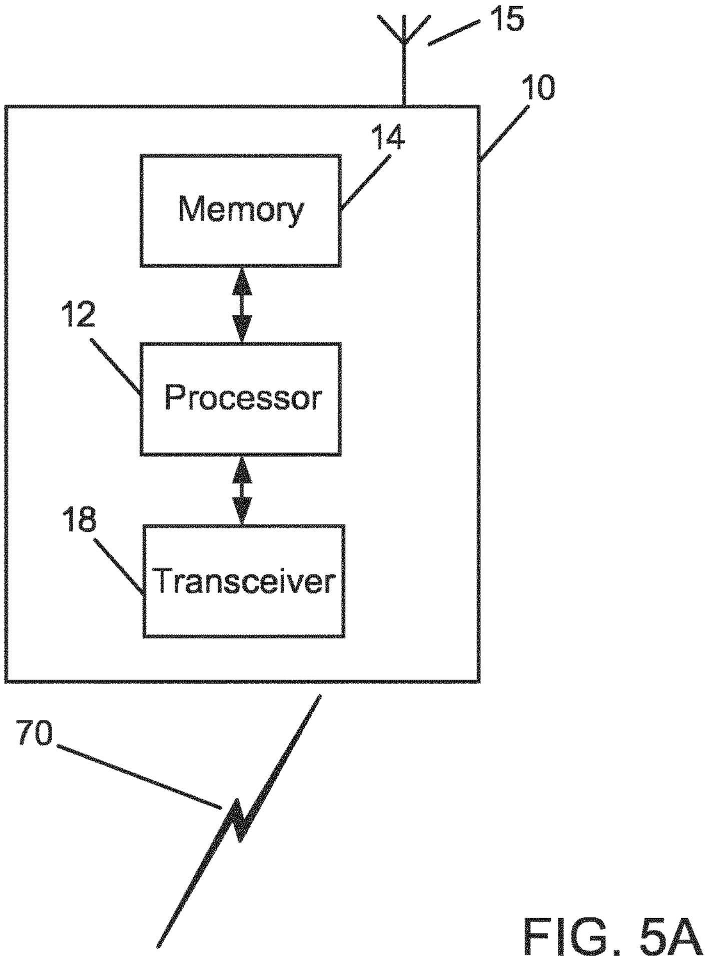
FIG. 5A illustrates an example block diagram of an apparatus, according to an embodiment.

FIG. 5A illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, satellite access, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5A.

As illustrated in the example of FIG. 5A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 5A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, satellite access, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-4, or any other method described herein. In some embodiments, as discussed herein, apparatus 10 may be configured to perform a procedure relating to providing fast downlink beam switching assumptions related to quasi-colocation, for example.

Figure 5B:
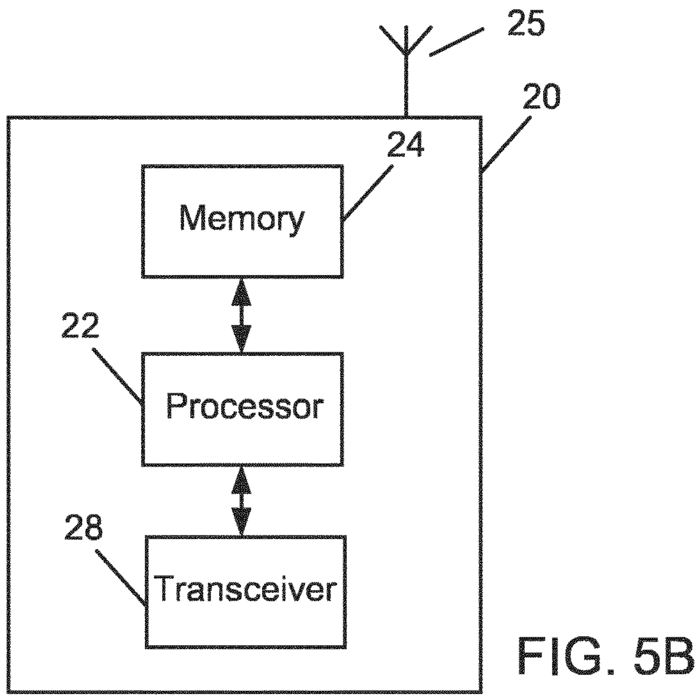
FIG. 5B illustrates an example block diagram of an apparatus, according to an embodiment.

FIG. 5B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5B.

As illustrated in the example of FIG. 5B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology, such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-4, or any other method described herein. For example, in an embodiment, apparatus 20 may be controlled to perform a process relating to providing fast downlink beam switching assumptions related to quasi-colocation, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, the approach of certain embodiments may simplify and accelerate beam switching particularly in cases where specific types of quasi-colocation information is available.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

CSI-RS Channel State Information Reference Signal
L1-RSRP Layer 1 Reference Signal Received Power
PDCCH Physical Downlink Control Channel
PDSCH Physical Downlink Shared Channel
QCL Quasi co-location
SSB Synchronization Signal Block
TCI Transmission Coordination Indicator
UE User Equipment

What is claimed is:

1. An apparatus, comprising:

at least one processor; and at least one memory including computer program instructions, wherein the at least one memory and the computer program instructions are configured to, with the at least one processor, cause the apparatus at least to perform:

providing, to a serving next generation Node B, a capability indication for beam-report-based fast transmission configuration indicator state switching;

receiving, from the serving next generation Node B, a configuration of one or more channel state information reference signal resource sets, each of the one or more channel state information reference signal resource sets being configured with a higher layer parameter trs-Info and with a respective quasi-colocation Type D reference signal;

receiving, from the serving next generation Node B, a configuration of downlink reference signals for Layer 1 reference signal received power beam reporting;

receiving, from the serving next generation Node B, an activation of beam-report-based fast transmission configuration indicator state switching;

measuring the configured downlink reference signals and reporting, to the serving next generation Node B, a best downlink reference signal based on Layer 1 reference signal received power;

determining whether the best reported downlink reference signal corresponds to one channel state information reference signal resource of the one or more channel state information reference signal resource sets configured with the higher layer parameter trs-Info, the determining comprising determining that the best reported downlink reference signal is quasi-colocated in terms of quasi-colocation Type D with the one channel state information reference signal resource, the quasi-colocation Type D being based on a spatial reception parameter corresponding to channel conditions and supporting beamforming wherein the one channel state information reference signal resource is associated with the higher layer parameter trs-Info;

receiving, from the serving next generation Node B after reporting the best downlink reference signal, a confirmation indication on a physical downlink control channel, the confirmation indication confirming that the best reported downlink reference signal is usable as a quasi-colocation Type D reference signal for a transmission configuration indicator state representing a new downlink beam pair link;

interpreting a downlink transmission configuration indicator state based on the determination regarding the reported downlink reference signal and based on the confirmation indication, wherein interpreting the downlink transmission configuration indicator state comprises determining that the one channel state information reference signal resource is a quasi-colocation Type A reference signal of the downlink transmission configuration indicator state and that the best reported downlink reference signal is the quasi-colocation Type D reference signal of the downlink transmission configuration indicator state; and controlling at least a receive beam or a transmit beam of the user equipment based on the interpretation of a downlink transmission configuration indicator state, wherein controlling at least the receive beam comprises applying the downlink transmission configuration indicator state a predefined time after receiving the confirmation indication on the physical downlink control channel.

2. A method performed by an apparatus, the method comprising:

providing, to a serving next generation Node B, a capability indication for beam-report-based fast transmission configuration indicator state switching;

receiving, from the serving next generation Node B, a configuration of one or more channel state information reference signal resource sets, each of the one or more channel state information reference signal resource sets being configured with a higher layer parameter trs-Info and with a respective quasi-colocation Type D reference signal;

receiving, from the serving next generation Node B, a configuration of downlink reference signals for Layer 1 reference signal received power beam reporting;

receiving, from the serving next generation Node B, an activation of beam-report-based fast transmission configuration indicator state switching;

measuring the configured downlink reference signals and reporting, to the serving next generation Node B, a best downlink reference signal based on Layer 1 reference signal received power, determining whether the best reported downlink reference signal corresponds to one channel state information reference signal resource of the one or more channel state information reference signal resource sets configured with the higher layer parameter trs-Info, the determining comprising determining that the best reported downlink reference signal is quasi-colocated in terms of quasi-colocation Type D with the one channel state information reference signal resource, the quasi-colocation Type D being based on a spatial reception parameter corresponding to channel conditions and supporting beamforming wherein the one channel state information reference signal resource is associated with the higher layer parameter trs-Info;

receiving, from the serving next generation Node B after reporting the best downlink reference signal, a confirmation indication on a physical downlink control channel, the confirmation indication confirming that the best reported downlink reference signal is usable as a quasi-colocation Type D reference signal for a transmission configuration indicator state representing a new downlink beam pair link;

interpreting a downlink transmission configuration indicator state based on the determination regarding the reported downlink reference signal and based on the confirmation indication, wherein interpreting the downlink transmission configuration indicator state comprises determining that the one channel state information reference signal resource is a quasi-colocation Type A reference signal of the downlink transmission configuration indicator state and that the best reported downlink reference signal is the quasi-colocation Type D reference signal of the downlink transmission configuration indicator state; and controlling at least a receive beam or a transmit beam of the user equipment based on the interpretation of a downlink transmission configuration indicator state, wherein controlling at least the receive beam comprises applying the downlink transmission configuration indicator state a predefined time after receiving the confirmation indication on the physical downlink control channel.

3. The method of claim 2, wherein the apparatus is the user equipment.

4. The method of claim 3, wherein the capability indication indicates that the user equipment supports beam-report-based fast transmission configuration indicator state switching based on a Layer 1 reference signal received power beam report.

5. The method of claim 4, wherein the one or more channel state information reference signal resource sets comprise a non-zero-power channel state information reference signal resource set configured with the higher layer parameter trs-Info.

6. The method of claim 5, wherein the downlink reference signals configured for Layer 1 reference signal received power beam reporting comprise synchronization signal block resources or channel state information reference signal resources.

7. The method of claim 6, wherein reporting the best downlink reference signal comprises reporting a resource index and a Layer 1 reference signal received power value corresponding to the best downlink reference signal.

8. The method of claim 7, wherein the confirmation indication is detected by the user equipment in downlink control information carried on the physical downlink control channel.

9. The method of claim 8, wherein the downlink control information comprises a new or modified downlink control information format configured to confirm beam-report-based fast transmission configuration indicator state switching.

10. The method of claim 9, wherein the quasi-colocation Type A reference signal is associated with Doppler shift, Doppler spread, average delay, and delay spread, and wherein the quasi-colocation Type D reference signal is associated with the spatial reception parameter.

11. The method of claim 10, wherein applying the downlink transmission configuration indicator state comprises applying the downlink transmission configuration indicator state three milliseconds after receiving the confirmation indication on the physical downlink control channel.

* * * * *